United States Patent [19]

Hirohata

[11] Patent Number: 4,466,725

[45] Date of Patent: Aug. 21, 1984

[54] ELECTROMAGNETIC DRIVE DEVICE FOR CAMERA

[75] Inventor: Michio Hirohata, Tokyo, Japan

[73] Assignee: Canon Kabushiki Kaisha, Tokyo, Japan

[21] Appl. No.: 482,627

[22] Filed: Apr. 6, 1983

[30] Foreign Application Priority Data

Apr. 16, 1982 [JP] Japan ................................. 57-64146
Apr. 16, 1982 [JP] Japan ................................. 57-64147
Apr. 16, 1982 [JP] Japan ................................. 57-64148

[51] Int. Cl.³ .......................... G03B 3/02; G03B 7/085
[52] U.S. Cl. .................................... 354/403; 354/400; 354/453; 354/455; 354/271.1; 354/274
[58] Field of Search ............... 354/400, 402, 403, 453, 354/455, 271.1, 274

[56] References Cited

U.S. PATENT DOCUMENTS 4,367,931  1/1983  Kawai et al. .................. 354/453 X Primary Examiner—Michael L. Gellner
Attorney, Agent, or Firm—Toren, McGeady and Stanger

[57] ABSTRACT

An electromagnetic drive device for a camera includes two exciting coils which have the power supply thereto controllable independent of each other. The two exciting coils are disposed either on the inner or outer side of a lens barrel which carries a photo-taking lens. The direction of magnetic flux formed by each of these two exciting coils is shiftable either to the direction of the optical axis of the photo-taking lens or to a direction perpendicular to the optical axis by controlling the direction of the power supply to these two exciting coils. Shifting the photo-taking lens to an in-focus position and controlling the action of a light quantity control member disposed within the lens barrel can be accomplished independently.

8 Claims, 17 Drawing Figures

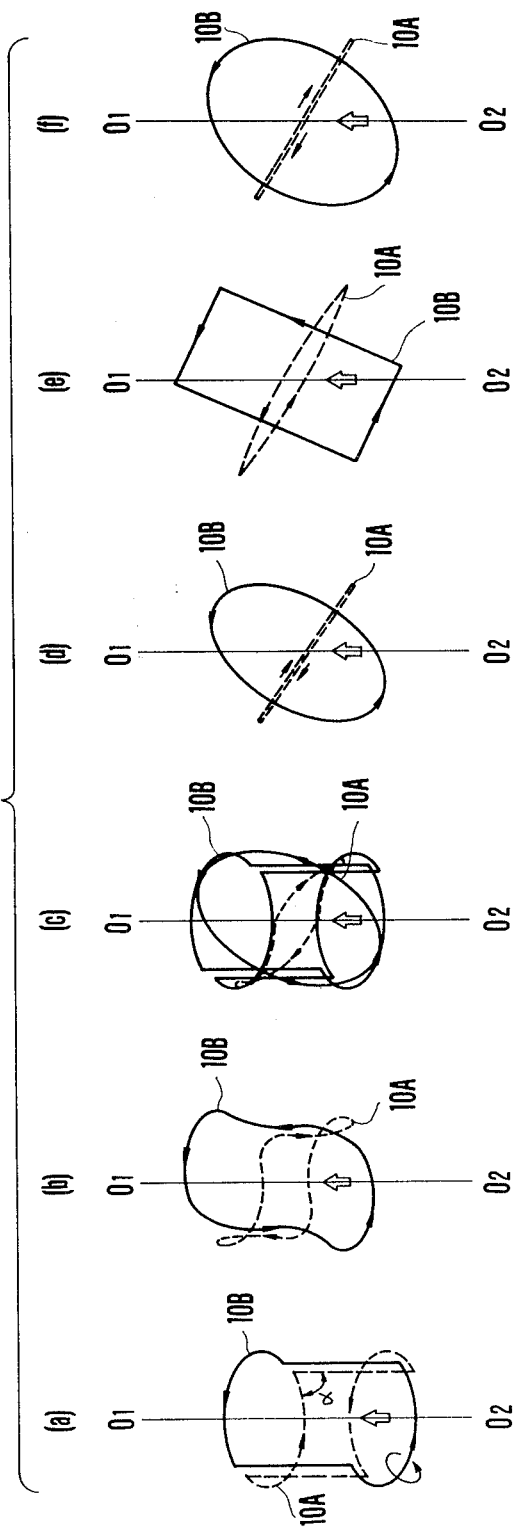

or a mechanism that permits reduction in the number of parts required by coordination and consolidation of different mechanisms and components.

ELECTROMAGNETIC DRIVE DEVICE FOR CAMERA

BACKGROUND OF THE INVENTION

1. Field of the Invention

This invention relates to an electromagnetic drive device for a camera performing a focusing action and an exposure effecting action by means of electro-magnetic forces generated by power supplied to the exiciting coils.

2. Description of the Prior Art

Heretofore there have been proposed various kinds of cameras having electromagnetic drive devices. For example, Japanese Laid-Open Patent application No. Sho 50-28832 which was published Mar. 24, 1975 disclosed a technique in which a hollow rotor such as a permanent magnet or the like was around a photo-taking optical path driving diaphragm blades disposed within a lens barrel while a stator consisting of an iron core, an exciting coil, etc. was outside the hollow rotor; and opening and closing actions of the diaphragm blades was controlled by the rotation of this rotor.

There have also been proposed many different arrangements using electromagnetic driving mechanisms for moving a movable lens barrel which carries a photo-taking lens within a stationary tube in the direction of the optical axis of the lens. For example, Japanese Laid-Open Patent application No. Sho 57-20710, published Feb. 3, 1982, disclosed an arrangement in which a stationary tube and a movable lens barrel were provided with a linear motor mechanism. Furthermore, Japanese Laid-Open Patent application No. Sho 56-147132, published Nov. 14, 1981, disclosed a device in which a stepped arrangement of magnetic pole teeth was provided on the periphery of a movable lens barrel carrying a photo-taking lens while a stator was on the inner circumference of a stationary tube opposite the electromagnetic teeth to form a stepping motor in conjunction with the latter; and the photo-taking lens was driven by means of pulse waves.

Meanwhile, there have been technological changes in the quality and shapes of sensitive materials such as the use of roll film, discs type film, magnetic tape, magnetic disc, etc. These changes accordingly necessitate changes in photographic apparatus mechanisms. Reduction in size and function consolidation of photographic apparatus have become desirable in response to size reduction i film or tape and to a great extent the adoption of integrated circuits. However, the above-stated electromagnetic drive devices are used for driving diahragm blades and photo-taking lens and they are not incorporated to coordinate the structural arrangement of the photo-taking lens barrels. Therefore, the electromagnetic drive devices have many problems remaining to be solved with respect to their structural arrangement. It is a recent tendency of photographic apparatus to have many different mechanisms incorporated in the body of the apparatus including an automatic focusing mechanism, an automatic film loading mechanism, a winding up mechanism and safety and warning mechanisms. Accordingly, it is desirable to have an apparatus

SUMMARY OF THE INVENTION

The apparatus in accordance with the invention provides an electromagnetic drive device for a camera with a very simple structural arrangement wherein two exciting coils have the power supply thereto controllable independent of each other. The two exciting coils are incorporated in a lens barrel assembly of the camera; two magnetic fields are obtainable in a direction parallel to an optical axis and in a direction perpendicular to the optical axis by shifting the direction of the power supply to the exciting coils. A lens barrel, which is movable, and a light quantity control member are driven by means of these magnetic fields.

The apparatus may include a novel structural arrangement of an electromagnetic drive device for a camera which permits light quantity control members such as shutter blades or diaphragm blades to be tightly sealed within a lens barrel.

The electromagnetic drive device may advantageously have a lens barrel set either in a short distance in-focus position or in a long distance in-focus position depending on the output of a focal point detection circuit of the camera. A light quantity control member is also set either on a large diameter side or on a small diameter side depending on the output of an exposure control circuit of the camera.

These and further objects and features of the invention will become apparent from the following detailed description of preferred embodiments thereof taken in conjunction with the accompanying drawings.

BRIEF DESCRIPTION OF THE DRAWINGS

FIGS. 8(a)-8(f) are schematic views showing various examples of the exciting coils used in embodiments of the invention.

DETAILED DESCRIPTION OF THE PREFERRED EMBODIMENTS

Figure 1:
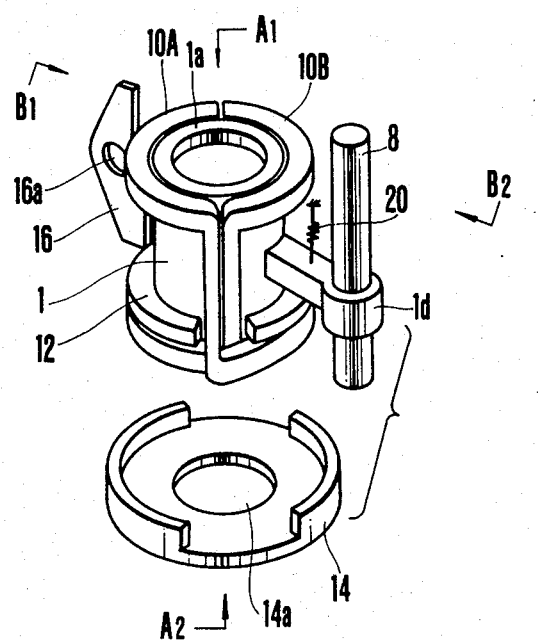
FIG. 1 is an oblique view showing an electromagnetic drive device of a camera in one embodiment of the invention.
Figure 2:
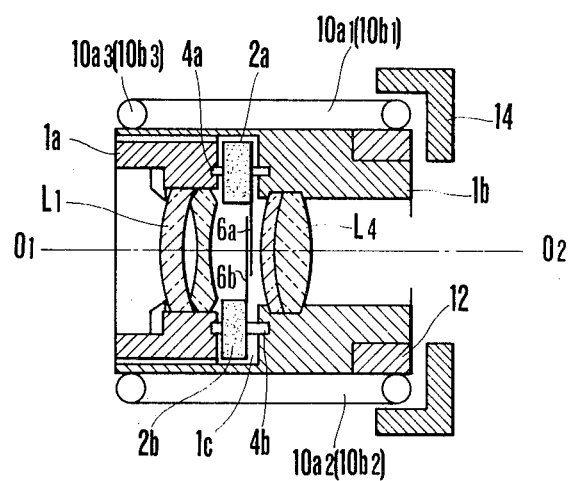
FIG. 2 is a sectional view of the same embodiment taken along a line defined by arrows $A_1$ and $A_2$ in FIG. 1.
Figure 4A:
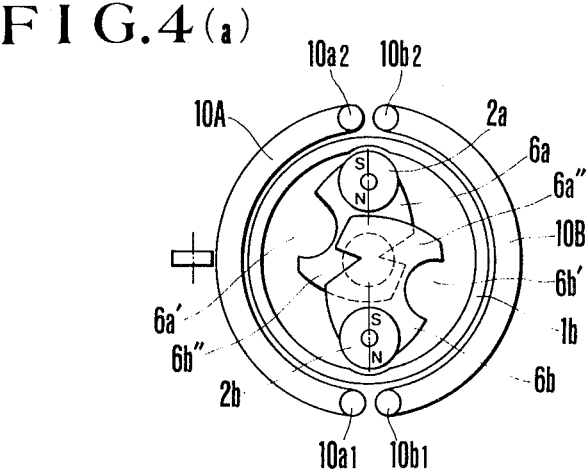
FIGS. 4(a), (b) and (c) are sectional views of the same embodiment taken in a direction which is perpendicular to the optical axis thereof.
Figure 4B:
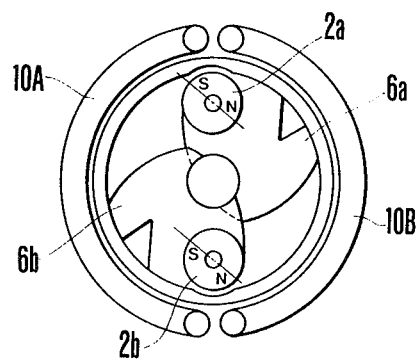
Figure 4C:
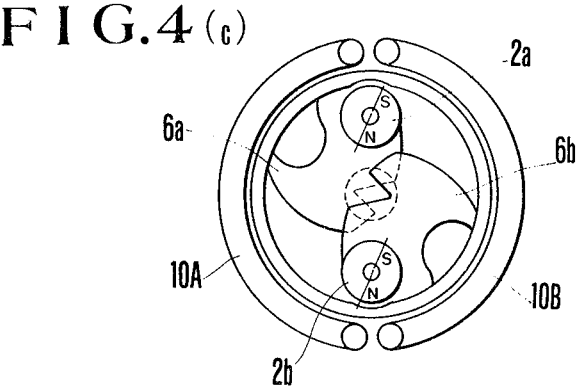

Referring to the accompanying drawings, a photo-taking lens $L_1-L_4$ (see FIG. 2) is carried by a movable lens barrel 1 (see FIG. 1) which is movable in a direction parallel to an optical axis $O_1-O_2$. The lens barrel 1 comprises a first lens barrel 1a and a second lens barrel 1b and is provided with a recess 1c which is formed in the inner circumferential wall. The recess 1c has ring-shaped magnets 2a and 2b inserted therein. These ring-shaped magnets 2a and 2b are rotatably carried by the lens barrel 1 through supporting shafts 4a and 4b which extend parallel with the optical axis $O_1$–$O_2$ of the phototaking lenses $L_1$–$L_4$. Referring to FIGS. 4(a)–4(c), each of these ring-shaped magnets 2a and 2b is magnetized in a direction which is perpendicular to the optical axis $O_1$–$O_2$. The polarity of one magnet 2a, 2b is opposite that of the other magnet 2a, 2b. In the condition shown in FIG. 4(a), the magnetic forces of the two magnets 2a and 2b are acting to attract each other. To these ring-shaped magnets 2a and 2b are secured shutter blades 6a and 6b which also serve ad siaphragm blades for controlling the quantity of light passing through the optical axis $O_1$–$O_2$. The shutter blades 6a and 6b operate as the magnets 2a and 2b rotate and thus control an optical path by opening and closing it. The shutter blades 6a and 6b are provided with cutout parts 6a' and 6b' which are on one side of each shutter blades 6a, 6b, forming a large diaphragm aperture when the condition of the magnets 2a and 2b is as shown in FIG. 4(b). On the other sides of the shutter blades 6a and 6b, there are provided cutouts 6a" and 6b" which form a small diaphragm aperture when the magnets 2a and 2b are as shown in FIG. 4(c).

A support arm 1d is secured to the lens barrel 1 and the fore end of the arm 1d slidably engages a guide rod 8, which is attached to the camera body or the base plate thereof, which is not shown.

Figures 6A, 6B, 6C:
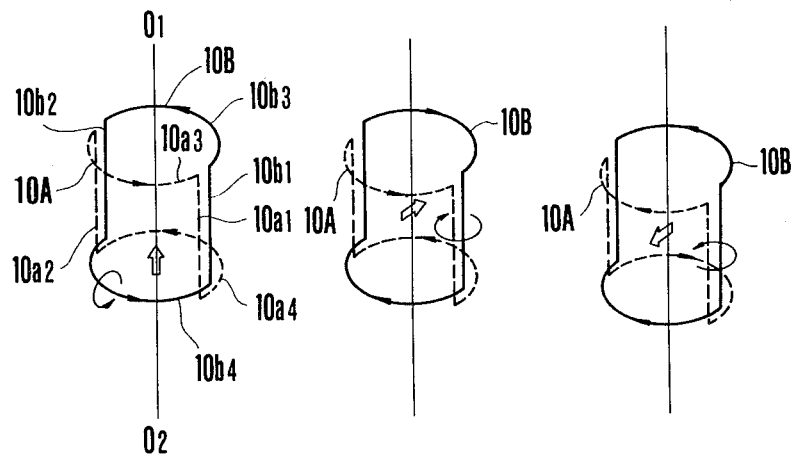
FIGS. 6(a), (b) and (c) are scehmatic views of the embodiment of FIG. 1 showing the direction of a magnetic field which varies when the direction of the power supply to the coil is shifted.

The embodiment includes exciting coils 10A and 10B which are disposed on the outer circumference of the lens barrel 1. These exciting coils 10A and 10B consist of wire portions $10a_1$ and $10a_2$ and wire portions $10b_1$ and $10b_2$ which are parallel with the optical axis $O_1$–$O_2$ as shown in FIG. 6(a) and wire portions $10a_3$, $10a_4$, $10b_3$ and $10b_4$ which are around the optical axis $O_1$–$O_2$ forming semi-circles along the outer circumference of the lens barrel. These semi-circular portions $10a_3$ and $10a_4$ of the exciting coil 10A and the semi-circular portions $10b_3$ and $10b_4$ of the exciting coil 10B are along the upper and lower ends of the lens barrel 1. The semi-circular portions $10a_3$ and $10b_3$ jointly form a circle along the upper end of the lens barrel 1. The semi-circular portions $10a_4$ and $10b_4$ jointly form a circle along the lower end of the lens barrel 1. Furthermore, the semi-circular portions $10a_3$ and $10a_4$ are bent at an angle of 90 degrees relative to the linear portions $10a_1$ and $10a_2$ on opposite sides in such a manner that the power supply direction is always unvarying. Meanwhile, the semi-circular portions $10b_3$ and $10b_4$ are also bent at an angle of 90 degrees relative to the linear portions $10b_1$ and $10b_2$ so that the direction of the power supplied is unvarying. The positions of the exciting coils 10A and 10B relative to the above-stated ring-shaped magnets 2a and 2b are shown in FIGS. 4(a)–(c). More specifically, the exciting coils 10A and 10B have their wire portions $10a_1$ and $10b_1$, which are parallel with the opticall axis $O_1$–$O_2$ and their portions $10a_2$ and $10b_2$ respectively adjacent and parallel with each other. The wire portions $10a_3$ and $10b_3$ and the wire portions $10a_4$ and $10b_4$, which are around the optical axis $O_1$–$O_2$, form circles on both sides of the optical axis $O_1$–$O_2$. With the exciting coils 10A and 10B arranged in this manner, the ring-shaped magnets 2a and 2b respectively have the centers of their shafts 4a and 4b disposed on lines connecting the wire portions $10a_1$ and $10b_1$ to the wire portions $10a_2$ and $10b_2$ with the optical axis $O_1$–$O_2$ in the middle of the connecting lines. Under the condition shown in FIG. 4(a), one of the poles of each of the magnets 2a and 2b, that is, the S pole of the magnet 2a and the N pole of the magnet 2b, confronts the linear portions $10a_2$ and $10b_2$ and confronts the other linear portions $10a_1$ and $10b_1$ of the exciting coils 10A and 10B respectively.

Figure 3:
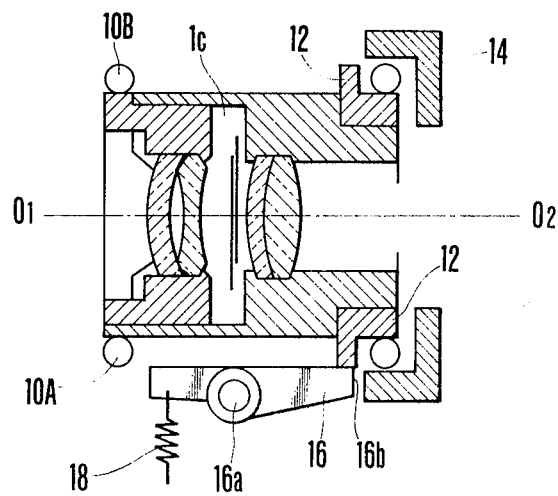
FIG. 3 is another sectional view of the same embodiment taken along a line defined by arrows $B_1$ and $B_2$ in FIG. 1.

An arcuate magnetic member 12, which is made of soft iron, is attached to the lens barrel 1. An attracting member 12 which is also made of a soft iron magnetic material is attached to the camera body or a base plate, which is not shown. An aperture 14a is provided for an optical path. A locking member 16 of the lens barrel 1 is pivotally supported either by the camera body or the base plate and is swingable on a fulcrum 16a thereof. Meanwhile, as shown in FIG. 3, a spring member 18 urges the lock member 16 to turn counterclockwise. With the lock member 16 turning counterclockwise, a claw part 16b thereof engages the magnetic member 12 locking the lens barrel 1. Also provided is another spring member 20 which retains the lens barrel 1 in its initial position (or a close-up distance position) as shown in the drawing.

Figure 5:
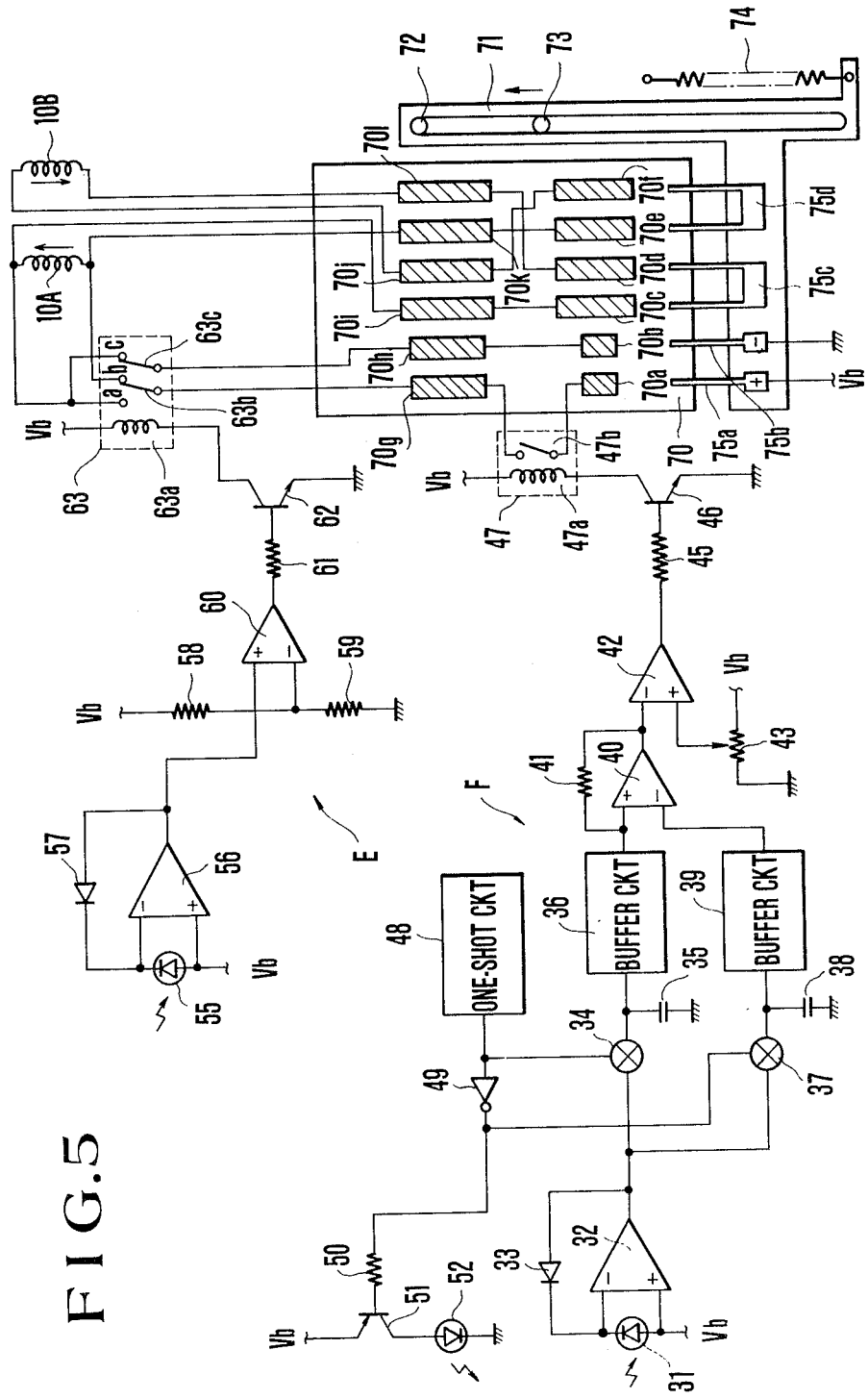
FIG. 5 is a circuit diagram showing, by way of example, the control circuit of the embodiment of FIG. 1.

Referring to FIG. 5, which is a circuit diagram showing an example of the control circuit arrangement of the embodiment, the circuit arrangement includes an automatic focusing circuit F which is of the active type. The automatic focusing circuit F controls the shifting operation of a switch 47b depending on the distance to the object to be photographed. An exposure control circuit E controls the shifting operation of switches 63b and 63c according to the brightness of the object to be photographed. In this embodiment, a light receiving photo-electro transducer element (SPC) 31 receives a reflection of the light projected from a light projecting or light emitting element (LED) 52. The light receiving element 31 is connected to the input side of an operational amplifier 32. A diode 33 is inserted in the negative feedback line of the operational amplifier 32. There are provided known analog switches 34 and 37 which store the output of the operational amplifier 32 at capacitors 35 and 37 while their control termnals are receiving a high level signal. An operational amplifier 40 and a resistor 41 compute the difference between the output of a buffer circuit 36, corresponding to the charge voltage of the capacitor 35, and the output of another buffer circuit 39, corresponding to the charge voltage of a capacitor 38. A comparator 42 compares the output of the operational amplifier 40 with a reference voltage produced at a variable resistor 43. The inversion input terminal of the comparator 42 is connected to the operational amplifier 40 while the non-inversion input terminal of the comparator 42 is connected to the variable resistor 43. The output terminal of the comparator 42 is connected to the base of an NPN transistor 46 via a resistor 45. The power supply to an electromagnet 47a of a relay 47 is controlled by the output of the transistor 46. A one-shot circuit 48 is composed of a monostable multivibrator or the like and has its output at a high level for a predetermined period of time after the power supply to the whole circuit arrangement begins in response to depression of the shutter release button. The output terminal of this one-shot circuit 48 is connected to the analog switch 34 and also to the other analog switch 37 through an inverter 49. The output terminal of the inverter 49 is also connected to the base of a PNP transistor 51 through a resistor 50. When the output level of the one-shot circuit 48 is high and that of the inverter 49 is low, power is supplied to a light emitting element 52 to light up the element 52.

There is provided a light receiving or light sensitive element (SPC) 55 to measure the brightness of the object to be photographed. The output of the light sensitive element 55 is logarithmically suppressed by a diode which is connected to an operational amplifier 56 and the negative feedback line thereof. After logarithmic suppression, the output of the light sensitive element 55 is supplied to the non-inversion input terminal of a comparator 60. To the inversion input terminal of the comparator 60 is supplied a reference voltage produced via resistors 58 and 59. The output terminal of the comparator 60 is connected to the base of an NPN transistor 62 via a resistor 61. The power supply to an electromagnet 63a of a relay 63 is thus controlled by the output of the comparator 60. Meanwhile, a switch 47b of the relay 47 and switches 63b and 63c of the relay 63 are operated respectively by the power supplied to the electromagnets 47a and 63a. In other words, the switch 47b is turned on by the power supplied to the electromagnet 47a. The switches 63b and 63c are connected to terminals b and c when power is not supplied to the electromagnet 63a and is connected to the terminals a and b when power is supplied to the electromagnets 47a and 63a.

A printed circuit board 70 has parallel conductor patterns 70a–70l on the surface thereof. Meanwhile, a sliding plate 71 is movably carried by guide pins 72 and 73 which are planted in the camera body. The plate 71 is thus movable up and down, as viewed on the drawing. A spring 74 urges the sliding plate 71 to move in the direction of the arrow. When the sliding plate 71 is unlocked in response to depressing the shutter release button, the spring 74 moves the sliding plate 71 in the direction of the arrow with the movement speed being controlled by a governor, which is not shown. To this sliding plate 71 are secured brushes 75a–75d which are electrically isolated from each other. When a brush 75a which has a voltage Vb impressed thereon in response to depressing the shutter release button, the brush 75a contacts the conductor pattern 70a, the brush 75b which is connected to the ground contacts the conductor pattern 70b, the brush 75c with the conductor patterns 70c and 70d and the brush 75d with the conductor patterns 70e and 70f. When the brush 75a contacts the conductor pattern 70g, the brush 75b contacts the conductor pattern 70h, the brush 75c contacts the conductor patterns 70i and 70j and the brush 75d contacts the conductor pattern 70k and 70l respectively.

Furthermore, the conductor pattern 70a is connected to the conductor pattern 70g via the switch 47b. The pattern 70b is connected to the pattern 70h, the pattern 70c to the pattern 70i, the pattern 70d to the pattern 70l, the pattern 70e to the pattern 70k and the pattern 70f to the pattern 70j respectively. Furthermore, the pattern 70g is connected to the switch 63b, the pattern 70h to the switch 63c, the pattern 70i to the terminals a and c, the pattern 70j to the pattern 70l via the coil 10B and the pattern 70k to the terminal b respectively. Meanwhile, the coil 10A is connected between the terminals a and b.

The embodiment which is described in the foregoing operates in the following manner: When the power supplied to the circuit shown in FIG. 5 begins in response to depressing the shutter release button, the one-shot circuit 48 produces a high level signal. The high level signal turns the PNP transistor 51 on through the inverter 49. With the transistor 51 thus turned on, the light emitting element 52 illuminates the object to be photographed. Then, the analog switch 34 turns on while the analog switch 37 turns off. Therefore, the output of the light sensitive element 31 (which is the sum of an output portion corresponding to the reflected light from the object and an output portion due to the effect of an external light) charges the capacitor 35. When the output level of the one-shot circuit 48 becomes low the light emitting element 52 is extinguished, the analog switch 34 turns off and the analog switch 37 turns on. Then, the output of the light sensitive element 31 solely includes the output portion due to the external light and the capacitor 38 is charged therewith. At that instant, the output of the operational amplifier 40 is a value corresponding to the quantity of reflected light from the object. When there is a great quantity of reflected light and when the distance to the object is short, the output of the operational amplifier 40 is higher than the reference voltage produced from the resistor 43. Conversely, when there is a small quantity of reflected light and the object is located at a great distance, the output of the operational amplifier 40 is lower than the reference voltage. Therefore, when the object to be photographed is at a short distance, the output level of the comparator 42 becomes low, turning off the transistor 46. No power is supplied to the electromagnet 47a and the switch 47b remains off. Furthermore, with the object at a great distance, the output level of the comparator 42 becomes high starting the power to the electromagnet 47 through the transistor 46. Accordingly, the switch 47b is turned on.

When, the sliding plate 71 moves in direction of the arrow bringing the brushes 75a–75d into contact with the patterns 70a–70f, no power is supplied to the coils 10A and 10B if the object is located at a short distance because the switch 47b is off. Under this condition, the lens barrel 1 is kept in the closed position by the spring 20, as shown in the drawing. In this instance, the phototaking lens $L_1$–$L_4$ is, of course, focused on an object at a short distance.

When the object to be photographed is located at a great distance, the switch 47 is on. Therefore, power is supplied to the exciting coils 10A and 10B in the direction of the arrow, as shown in FIG. 5, when the brushes 75a–75d contact the patterns 70a–70f. In other words, in this instance, the wire portions $10a_3$, $10a_4$, $10b_3$ and $10b_4$ of the first and second exciting coils 10A and 10B, which are around the optical axis $O_1$–$O_2$ have currents flowing in the same direction with the optical axis $O_1$–$O_2$ located at the center thereof. Meanwhile, the wire portions $10a_1$, $10b_1$ and wire portions $10a_2$ and $10b_2$ of the coils 10A and 10B have current flowing in opposite directions. As a result, the magnetic member 12, which is secured to the lens barrel 1, is magnetized. Attraction takes place between the magnetic member 12 and the attracting member 14 moving the lens barrel 1 from the close-up position, which is shown in the drawing, to an infinite distance position against the force of the spring 30. Furthermore, referring to FIG. 3, when the lens $L_1$–$L_4$ moves to the right and is in the infinity distance position, the spring 18 turns the locking member 16 counterclockwise. Then, the claw part 16b of the locking member 16 locks the magnetic member 12. The lens barrel 1 is therefore kept in the infinity position irrespective of the power supply change-over to the coils 10A and 10B.

In this instance, even if the positions of the switches 63b and 63c have been shifted to different sides from the sides shown in the drawing, the currents flowing through the semi-circular portions $10a_3$, $10a_4$, $10b_3$ and $10b_4$ of the coils 10A and 10B are the same as above except that the directions of the currents are reversed. The magnetic member 12 is magnetized when the brushes 75a–75d contact the patterns 70a–70f in the same manner as above. Therefore, the lens barrel 1 also moves in this situation.

After that, the sliding plate 71 slides further in the direction of the arrow bringing the brushes 75a–75d into contact with the patterns 70g–70l provided on the printed board 70.

If, in this instance, the brightness of the object to be photographed is lower than a prescribed level, the output level of the comparator 60 becomes low. Then, no power is supplied to the electromagnet 63a. The switches 63b and 63c are, therefore, in contact with the terminals b and c, as shown in FIG. 5. In this case, a current flows to the exciting coil 10A in the direction of the arrow, as shown in FIG. 5, while a current flows to the exciting coil 10B in a direction opposite that of the arrow of FIG. 5. Then, the direction of a magnetic field produced by the exciting coils 10A and 10B is shown in FIG. 6(b). Accordingly, the ring-shaped magnet members 2a and 2b then turn counterclockwise on their shafts 4a and 4b as shown in FIG. 4(b) to form the large aperture by means of the shutter blades 6a and 6b. Then the brushes 75a and 75b pass over the conductor patterns 70g and 70h cutting off the power supply to the exciting coils 10A and 10B. With the power thus cut off, the magnetic poles of the magnet members 2a and 2b interact on each other returning to the positions shown in FIG. 4(a). Therefore, the shutter blades 6a and 6b close the aperture completing an exposure after attaining a proper degree of exposure.

Figure 7:
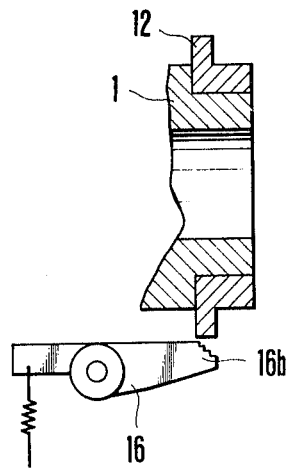
FIG. 7 is a fragmentary view of another embodiment of the invention in which the movable lens barrel is adjustable.

If, on the other hand, the brightness of the object is higher than the prescribed level, the output level of the comparator 60 is high to effect power supply to the electromagnet 63a. Therefore, when the brushes 75a–75d contact the patterns 70g–70l, the switches 63b and 63c are in contact with the terminals a and b respectively. In this situation, a current flows to the exciting coil 10A in a direction opposite the direction of the arrow of FIG. 5 while a current flows to the other exciting coil 10B in the direction of the arrow of FIG. 5. The direction of a magnetic field then produced by the exciting coils 10A and 10B is shown in FIG. 6(c). Accordingly, the magnet members 2a and 2b turn clockwise on their shafts 4a, 4b causing the shutter blades 6a and 6b to form a small aperture. The ensuing actions are identical with those described in the foregoing. Furthermore, with the sliding plate 71 moving further from focusing to exposure, when the shutter blades 6a and 6b are perforemd, most of the magnetic fluxes produced at the arcuate portions $10a_3$, $10a_4$, $10b_3$ and $10b_4$ of the exciting coils 10A and 10B flow within the magnetic member 12 and the attracting member 14 in such a manner that no attraction occurs between these members 12 and 14. Furthermore, in the embodiment described above, if the locking member 16 of the lens barrel 1 is provided with a stepped locking engagement part 16 formed at its engaging end as shown in FIG. 7, distance shifting can be effected at several points.

Various modifications of arrangements of the exciting coils 10A and 10B are shown in FIGS. 8(b)–(f). The shape of an exciting coil 10A, 10B arrangement shown in FIG. 8(a) is identical with that of the embodiment described in the foregoing. In FIG. 8(a), as mentioned in the foregoing, the exiting coil 10A, 10B arrangement consists of the wire portions $10a_1$, $10a_2$, $10b_1$ and $10b_2$ which are on the periphery of the cylindrical lens barrel 1 in parallel with the optical axis $O_1$–$O_2$ and wire portions $10a_3$, $10a_4$, $10b_3$ and $10b_4$ which are around the optical axis $O_1$–$O_2$, as has been described in the foregoing. However, the coil 10A, 10B arrangement of the shape shown in FIG. 8(a) presents a manufacturing problem when incorporating it into an actual product, because: The wire portions which are in a direction parallel to the optical axis $O_1$–$O_2$ are approximately perpendicular to the wire portions which are around the optical axis $O_1$–$O_2$. This shape does not permit the coil 10A, 10B arrangement to be readily manufactured. With respect to the shape of the exciting coils 10A, 10B, an elliptical shape or a circular shape such as the shapes shown in FIGS. 8(d) and (f) can be more easily formed. FIGS. 8(b) and (c) show examples of easing an angle $\alpha$ shown in FIG. 8(a) bringing it closer and closer to the elliptical shape shown in FIG. 8(d). With the exciting coils 10A and 10B in the elliptical shape shown in FIG. 8(d) and on the periphery of the lens barrel 1 in symmetrical positions relative to the optical axis $O_1$–$O_2$, magnetic fields can be formed for driving the light quantity control member and the lens barrel 1 by switching over the power supply direction between a first direction as shown in FIG. 8(b) and a second direction, which is opposite the first direction, by means of the power supply change-over circuit. The drive control can be accomplished, as desired, with this exciting coil 10A, 10B arrangement. Furthermore, in this instance, the magnetic field for driving the light quantity control member and the magnetic field for driving the movable lens barrel 1 can have the same efficiency by arranging the ratio between the minor and major axes of the elliptical shape of FIG. 8(d) to be $\sqrt{2}$. The exciting coils 10A, 10B may be formed into a rectangular or square shape or into a circular shape as shown in FIG. 8(e) or 8(f). These shapes respectively facilitate working and assembling processes.

In this specific embodiment, the exciting coils 10A and 10B are along the outer circumference of the lens barrel 1. However, they may be along the inner circumference of the lens barrel 1. Furthermore, in this embodiment, a light receiving element 31 for automatic focusing and a light receiving element 55 for measuring the brightness of an object to be photographed are separately arranged. However, in the system according to the invention, the control, which has been described in the foregoing, can also be performed, by connecting the output of the operational amplifier 32 to the non-inversion input terminal of the comparator 60. In accordance with the invention the electromagnetic drive device may be arranged without the light receiving element 55, the operational amplifier 56 and the diode 57.

As will be apparent from the foregoing description, in accordance with the present invention, two drive mechanisms for a focusing unit, which consists of a lens $L_1$–$L_4$ and a lens barrel 1 and an exposure adjustment unit, which consists of shutter blades 6a–6b can be controlled by switching the direction of power to the exciting coils 10A and 10B between the first and second directions. Unlike the conventional arrangement, the invention obliterates the necessity of discretely providing independent electromagnetic mechanisms for the two units, so that the lens barrel 1 can be compactly arranged.

The camera embodying the present invention is of the type in which the distance selection of the photo-taking lens $L_1$–$L_4$ is made between two points for close-ups and the other for long distances. The position of the shutter blades 6a–6b for exposure adjustment is also shifted between open and closed. The camera, therefore, can be arranged with a relatively simple circuit arrangement without necessitating complex operation by virtue of the arrangement which is pre-programmed according to the distance and brightness of the object Application of the invention to a two-point selection type camera obliterates the necessity of providing complex delivering and focusing mechanisms for a lens barrel 1 to permit a reduction in camera cost and price.

What I claim:

1. An electromagnetic drive device for a camera, comprising:
   (a) a lens barrel having a light quantity control member and a photo-taking lens arranged therein, said lens barrel being arranged to be shiftable in the direction of the optical axis of said lens;
   (b) first and second exciting coils disposed at the lens barrel, said first and second exciting coils being arranged to produce a first magnetic field in a direction parallel to the optical axis of the photo-taking lens when the direction of power supply to the second exciting coil is in a first state relative to the direction of power supply to the first exciting coil and to produce a second magnetic field in a direction perpendicular to the optical axis of the photo-taking lens when the direction of power supply to the second exciting coil is in a second state relative to the direction of power supply to the first exciting coil;
   (c) switching means for switching over the directions of power supply to said first and second exciting coils from said first state to said second state after the lapse of a period of time required for shifting said lens barrel;
   (d) a first magnetic member arranged to produce an electromagnetic force for shifting the lens barrel when said first magnetic field is produced; and
   (e) a second magnetic member arranged to produce an electromagnetic force for actuating said light quantity control member when said second magnetic field is produced.

2. A device according to claim 1, further including:
   (f) a focusing circuit which is capable of controlling the power supply to said first and second exciting coils accordingly to distance to an object to be photographed; and
   (g) an exposure control circuit which is capable of controlling the power supply to said first and second exciting coils according to the brightness of said object.

3. A device according to claim 2, wherein each of said first and second exciting coils has a first portion which is in parallel with the optical axis of said photo-taking lens and a second portion which is formed into a semi-circular shape with the optical axis of said photo-taking lens in the center thereof.

4. A device according to claim 3, wherein said first portion of the first exciting coil and said first portion of the second exciting coil are arranged closely adjacent to each other while said second portions of the first and second exciting coils are arranged in such a way as to encompass said photo-taking lens.

5. A device according to claim 1, further including:
   (h) a spring member which urges said lens barrel to stay in the original position thereof.

6. A device according to claim 5, further including:
   (i) a locking member which locks said lens barrel when said lens barrel is shifted from the original position thereof.

7. A device according to claim 6, wherein said second magnetic member is provided with a permanent magnet which is secured to said light quantity control member and is magnetized in a direction perpendicular to the optical axis of said photo-taking lens.

8. A device according to claim 7, wherein said light quantity control member is arranged to be two light quantity control members; and said permanent magnet is provided at each of said two light quantity control members with different polarities of these permanent magnets being opposed to each other.

* * * * *